US006505168B1

United States Patent
Rothman et al.

(10) Patent No.: US 6,505,168 B1
(45) Date of Patent: Jan. 7, 2003

(54) SYSTEM AND METHOD FOR GATHERING AND STANDARDIZING CUSTOMER PURCHASE INFORMATION FOR TARGET MARKETING

(75) Inventors: Michael J. Rothman, Hopewell Junction, NY (US); Kathleen H. Witsil, Kenneth Square, PA (US); David W. Nanek, Stormville, NY (US)

(73) Assignees: First USA Bank, NA, Wilmington, DE (US); International Business Machines Corp., Armonk, NY (US)

( * ) Notice: Subject to any disclaimer, the term of this patent is extended or adjusted under 35 U.S.C. 154(b) by 0 days.

(21) Appl. No.: 09/375,234

(22) Filed: Aug. 16, 1999

(51) Int. Cl.[7] ............................................. G06R 17/60
(52) U.S. Cl. ........................................ 705/10; 705/14
(58) Field of Search ..................................... 705/10, 14

(56) References Cited

U.S. PATENT DOCUMENTS

| | | | |
|---|---|---|---|
| 4,254,474 A | | 3/1981 | Cooper et al. |
| 4,355,372 A | * | 10/1982 | Johnson et al. ............. 364/900 |
| 4,396,985 A | | 8/1983 | Ohara ......................... 364/405 |
| 4,567,359 A | | 1/1986 | Lockwood ................. 235/381 |
| 4,723,212 A | | 2/1988 | Mindrum et al. ........... 364/401 |
| 4,750,036 A | | 6/1988 | Martinez .................... 358/147 |
| 4,750,119 A | | 6/1988 | Cohen et al. ............... 364/401 |
| 4,760,604 A | | 7/1988 | Cooper et al. |
| 4,882,675 A | | 11/1989 | Nichtberger et al. ........ 364/401 |
| 4,897,811 A | | 1/1990 | Scofield |
| 4,906,826 A | | 3/1990 | Spencer ...................... 235/379 |
| 4,910,672 A | | 3/1990 | Off et al. .................... 364/405 |
| 4,958,375 A | | 9/1990 | Reilly et al. |
| 4,972,504 A | * | 11/1990 | Daniel, Jr. et al. ............ 705/10 |
| 4,992,940 A | | 2/1991 | Dworkin ..................... 364/401 |
| 5,025,372 A | | 6/1991 | Burton et al. ............... 364/406 |
| 5,041,972 A | * | 8/1991 | Frost ............................ 705/10 |
| 5,047,614 A | | 9/1991 | Bianco ........................ 235/385 |
| 5,117,355 A | | 5/1992 | McCarthy ................... 364/405 |
| 5,128,752 A | | 7/1992 | Von Kohorn ................ 358/84 |
| 5,173,589 A | | 12/1992 | Diehl et al. ................. 235/375 |
| 5,173,851 A | | 12/1992 | Off et al. .................... 364/401 |
| 5,202,826 A | | 4/1993 | McCarthy ................... 364/405 |
| 5,220,501 A | | 6/1993 | Lawlor et al. .............. 364/408 |
| 5,233,514 A | | 8/1993 | Ayyoubi et al. ............ 364/408 |
| 5,249,044 A | | 9/1993 | Von Kohorn ................ 358/86 |
| 5,250,789 A | | 10/1993 | Johnsen ...................... 235/383 |
| 5,253,066 A | | 10/1993 | Vogel .......................... 358/188 |

(List continued on next page.)

FOREIGN PATENT DOCUMENTS

| | | | | |
|---|---|---|---|---|
| WO | WO 99/12115 | * | 3/1999 | ................... 705/10 |
| WO | WO 99/39281 | * | 5/1999 | ................... 705/10 |

OTHER PUBLICATIONS

Virtual Store—Year M 1997 Book p 121.*
"Utilities, Telcos Seek Marketing Edge"–Computerworld–v32n16 pp 20 Apr. 20, 1988–Stedman,C.*
"Customer Based Management: Leverage Telemarketing and Call Center Environment"–Direct Marketing v59n6 pp 20–67 Oct., 1996.*

(List continued on next page.)

*Primary Examiner*—V. Millin
*Assistant Examiner*—Geoffrey Akers
(74) *Attorney, Agent, or Firm*—Hunton & Williams

(57) ABSTRACT

The present invention relates to storing and manipulating customer purchasing information, particularly purchasing information by credit cards, debit cards, checks, and the like. A hierarchical organizational structure is created comprising a plurality of categories and sub-categories. The customer purchase information may then be retrieved according to user created links to generate customer preference information. The customer preference information may be stored in a customer account, thereby allowing targeted offers to be made to customers.

58 Claims, 6 Drawing Sheets

U.S. PATENT DOCUMENTS

| | | |
|---|---|---|
| 5,260,778 A | 11/1993 | Kauffman et al. ............ 358/86 |
| 5,262,860 A | 11/1993 | Fitzpatrick et al. ......... 358/142 |
| 5,278,751 A | 1/1994 | Adiano et al. .............. 364/402 |
| 5,285,278 A | 2/1994 | Holman ...................... 358/142 |
| 5,287,181 A | 2/1994 | Holman ...................... 348/473 |
| 5,287,268 A | 2/1994 | McCarthy ................... 364/405 |
| 5,297,026 A | 3/1994 | Hoffman ..................... 364/408 |
| 5,351,186 A | 9/1994 | Bullock et al. ............. 364/401 |
| 5,380,991 A | 1/1995 | Valencia et al. ............ 235/383 |
| 5,396,417 A | 3/1995 | Burks et al. ................ 364/401 |
| RE34,915 E | 4/1995 | Nichtberger et al. ........ 364/401 |
| 5,442,567 A | 8/1995 | Small ......................... 364/479 |
| 5,444,844 A | 8/1995 | Inoue et al. ................. 395/161 |
| 5,488,423 A | 1/1996 | Walkingshaw et al. ..... 348/460 |
| 5,488,571 A | 1/1996 | Jacobs et al. .......... 364/705.07 |
| 5,490,060 A * | 2/1996 | Malec et al. .................. 705/10 |
| 5,491,838 A | 2/1996 | Takahisa et al. ............. 455/66 |
| 5,500,514 A | 3/1996 | Veeneman et al. .......... 235/381 |
| 5,500,681 A | 3/1996 | Jones ......................... 348/473 |
| 5,504,519 A | 4/1996 | Remillard ...................... 348/7 |
| 5,508,731 A | 4/1996 | Kohorn ......................... 348/1 |
| 5,513,102 A | 4/1996 | Auriemma .................. 364/408 |
| 5,513,117 A | 4/1996 | Small ......................... 364/479 |
| 5,521,363 A | 5/1996 | Tannenbaum ............... 235/379 |
| 5,523,794 A | 6/1996 | Mankovitz et al. ......... 348/460 |
| 5,537,314 A | 7/1996 | Kanter ....................... 364/406 |
| 5,551,021 A | 8/1996 | Harada et al. .............. 395/600 |
| 5,559,313 A | 9/1996 | Claus et al. ................. 235/380 |
| 5,564,073 A | 10/1996 | Takahisa ....................... 455/66 |
| 5,570,295 A | 10/1996 | Isenberg et al. ............ 364/514 |
| 5,594,493 A | 1/1997 | Nemirofsky ................. 348/13 |
| 5,598,557 A | 1/1997 | Doner et al. |
| 5,603,025 A | 2/1997 | Tabb et al. ................. 395/602 |
| 5,604,542 A | 2/1997 | Dedrick ...................... 348/552 |
| 5,612,868 A | 3/1997 | Off et al. .................... 364/214 |
| 5,625,767 A | 4/1997 | Bartell et al. |
| 5,634,101 A | 5/1997 | Blau |
| 5,652,602 A | 7/1997 | Fishman et al. ............ 345/156 |
| 5,664,115 A | 9/1997 | Fraser ......................... 705/37 |
| 5,665,953 A | 9/1997 | Mazzamuto et al. ........ 235/383 |
| 5,671,267 A | 9/1997 | August et al. ................ 379/61 |
| 5,671,409 A | 9/1997 | Fatseas et al. .............. 395/615 |
| 5,682,524 A | 10/1997 | Freund et al. |
| 5,689,100 A | 11/1997 | Carrithers et al. .......... 235/380 |
| 5,710,886 A | 1/1998 | Christensen et al. ........ 395/214 |
| 5,715,402 A | 2/1998 | Popolo ....................... 395/237 |
| 5,721,831 A | 2/1998 | Waits et al. ................. 395/210 |
| 5,724,424 A | 3/1998 | Gifford ........................ 380/24 |
| 5,727,163 A | 3/1998 | Bezos |
| 5,758,328 A | 5/1998 | Giovannoli .................. 705/26 |
| 5,761,647 A | 6/1998 | Boushy |
| 5,761,648 A | 6/1998 | Boushy ....................... 705/10 |
| 5,761,661 A | 6/1998 | Coussens et al. ............. 707/9 |
| 5,765,143 A | 6/1998 | Sheldon et al. |
| 5,767,896 A | 6/1998 | Nemirofsky ................ 348/13 |
| 5,774,878 A | 6/1998 | Marshall |
| 5,787,403 A | 7/1998 | Randle ........................ 705/43 |
| 5,794,178 A | 8/1998 | Caid et al. |
| 5,794,207 A | 8/1998 | Walker et al. ............... 705/23 |
| 5,806,044 A | 9/1998 | Powell ........................ 705/14 |
| 5,806,045 A | 9/1998 | Biorge et al. ................ 705/14 |
| 5,815,127 A | 9/1998 | Jacobs et al. .................. 345/2 |
| 5,819,092 A | 10/1998 | Ferguson et al. ........... 395/701 |
| 5,819,285 A | 10/1998 | Damico et al. |
| 5,832,457 A | 11/1998 | O'Brien et al. .............. 705/14 |
| 5,832,476 A | 11/1998 | Tada et al. |
| 5,835,087 A | 11/1998 | Herz et al. .................. 345/327 |
| 5,835,580 A | 11/1998 | Fraser |
| 5,842,178 A | 11/1998 | Giovannoli .................. 705/26 |
| 5,845,259 A | 12/1998 | West et al. ................... 705/14 |
| 5,857,175 A | 1/1999 | Day et al. |
| 5,862,223 A | 1/1999 | Walker et al. ................ 380/25 |
| 5,870,721 A | 2/1999 | Norris ......................... 705/38 |
| 5,870,724 A | 2/1999 | Lawlor et al. ............... 705/42 |
| 5,873,096 A | 2/1999 | Lim et al. ................... 707/201 |
| 5,884,278 A | 3/1999 | Powell ........................ 705/14 |
| 5,887,271 A | 3/1999 | Powell ........................ 705/14 |
| 5,890,135 A | 3/1999 | Powell ........................ 705/14 |
| 5,899,982 A | 5/1999 | Randle ........................ 705/35 |
| 5,918,214 A | 6/1999 | Perkowski ................... 705/27 |
| 5,926,812 A | 7/1999 | Hilsenrath et al. |
| 5,930,764 A | 7/1999 | Melchione et al. ........... 705/10 |
| 5,933,823 A | 8/1999 | Cullen et al. |
| 5,933,827 A | 8/1999 | Cole et al. |
| 5,940,811 A | 8/1999 | Norris ......................... 705/38 |
| 5,950,173 A | 9/1999 | Perkowski ................... 705/26 |
| 5,970,467 A * | 10/1999 | Alavi .......................... 705/10 |
| 5,970,483 A | 10/1999 | Evans |
| 5,974,396 A * | 10/1999 | Anderson et al. ............. 705/10 |
| 5,982,370 A | 11/1999 | Kamper |
| 5,987,434 A | 11/1999 | Libman ....................... 705/36 |
| 5,995,942 A * | 11/1999 | Smith et al. .................. 705/14 |
| 6,026,370 A * | 2/2000 | Jermyn ........................ 705/14 |
| 6,029,139 A * | 2/2000 | Cunningham et al. ........ 705/10 |
| 6,032,125 A * | 2/2000 | Ando .......................... 705/10 |
| 6,055,510 A * | 4/2000 | Henrick et al. ............... 705/14 |
| 6,070,147 A * | 5/2000 | Harms et al. ................. 705/14 |
| 6,078,892 A * | 6/2000 | Anderson et al. ............. 705/10 |

OTHER PUBLICATIONS

"Credit Scoring Digs Deeper Into Data", by Marc Friedland, *Credit World*, May 1996, v 84, n 5, p 19–23.

"A Credit Scoring Model to Evaluate the Credit Worthiness of Credit Card Applicants", by John C. Roger et al., *Developments in Marketing Science*, vol. V 1982, p 585.

"Credit Scoring New Markets (Credit disadvantaged people are proving to be a lucrative lending market for banks)", *Bank Technology News*, Jul. 1996, v 9, n 7, p 1+.

"Expanding Risk Management Strategies: Key to Future Survival (Credit card firms' risk management strategies and credit management tools require management information systems)", by Ron Jameson, *Credit World*, May 1996, v 84, N 5, p 16–18.

"FreeMarkets: Winner of the first–annual Interop E–Commerce Enterprise Award", FreeMarkets® Web Applications, FreeMarkets Online, Inc.

"Getting Smart with Java", ABCNews website, http://www.abcnews.go.com/sections/tech/DailyNews/amex_java00606.html.

"Getting Started" (Specific GE TPN Post Service Use Guidelines), GE, visited Apr. 26, 1999.

"Resource Center" (Consolidated Edison Selects GE TPN Post), GE, visited Apr. 26, 1999.

"Operations Research", Spring 1975 Bulletin from *The Operations Research Society of America*, Chicago, IL, Apr. 30–May 2, 1975.

"Opportunity Knocks at Scoring's Door (Trends and developments in scoring technology examined; scoring now is used for everything from prescreening credit card applicants to debt collections)", *Collections & Credit Risk*, Apr. 1997, v 2, n 4, p 53+.

"Product Data Integration Technologies, Inc. (PDIT)", PDIT website http://www.pdit.com, visited Apr. 26, 1999.

"SBA: PRO–Net® (U.S. Small Business Administration Procurement Marketing and Access Network)", SBA.

"SoluSource: for Engineers by Engineers: For You!", SoluSource website http://www.solusource.com visited Apr. 26, 1999.

"The Sub-Prime Credit Market: Identifying Good Risks for Unsecured Cards (The criteria for identifying good risks for unsecured credit cards when it comes to sub-prime borrowers include being aware of sensitivity, credit card orientation, and common information)", by James J. Carey, *Credit World*, Sep. 1996, v 85, n 1, p 13–15.

"Swift Gift'Wows' Internet Shoppers", *PRNewswire*, Wednesday, Dec. 2, 1998.

"ThomasNet (A Division of Thomas Publishing Company)", ThomasNet website http://www.thomasnet.com, visited Apr. 26, 1999.

"How the RMA/Fair, Isaac credit-scoring model was built", by Latimer Asch, *Journal of Commercial Lending*, v 77, n 10, pp. 10–16, Jun. 1995.

"Harris InfoSource", Harris, visited Apr. 26, 1999.

"Understanding Product Data Management (PDM in Brief)", Hewlett-Packard Company, PDM Information Company.

* cited by examiner

| TITLE/DESCRIPTION | COUNTS | PERCENTAGE (%) |
|---|---|---|
| SHOPPING (SHOPPING GENERAL PREFERENCES) | 1478 | 73.9 |
| DEPARTMENT STORES | 938 | 46.9 |
| HIGH $ | 573 | 28.7 |
| SAKS | 117 | 5.9 |
| NIEMAN MARCUS | 212 | 10.6 |
| BLOOMINGDALES | 24 | 1.2 |

FIG. 2

| OPERATOR | PREFERENCE | CHARACTERS | WORDSTRING |
|---|---|---|---|
| 0 | 596 | 9 | OTHER DIRECT MARKET |
| 0 | 599 | 9 | OTHER DIRECT RETAIL |
| 1 | 727 | 05 | "DELL_" |
| 6 | 651 | 05 | "LEVI_" |
| 6 | 651 | 06 | "LEVI'S" |
| 06 | 651 | 06 | "LEVIS_" |

FIG. 3

| TITLE/ACCOUNT | SCORE |
|---|---|
| SHOPPING | |
| CUSTOMER A | 60 |
| CUSTOMER B | 20 |
| CUSTOMER C | 10 |
| DEPARTMENT STORES | |
| CUSTOMER A | 80 |
| CUSTOMER B | 30 |
| CUSTOMER C | 20 |
| HIGH $ | |
| CUSTOMER A | 70 |
| CUSTOMER B | 30 |
| CUSTOMER C | 20 |
| SAKS | |
| CUSTOMER A | 90 |
| CUSTOMER B | 10 |
| CUSTOMER C | 40 |
| NIEMAN MARCUS | |
| CUSTOMER A | 90 |
| CUSTOMER B | 60 |
| CUSTOMER C | 30 |
| BLOOMINGDALES | |
| CUSTOMER A | 10 |
| CUSTOMER B | 50 |
| CUSTOMER C | 50 |

FIG. 6

SYSTEM AND METHOD FOR GATHERING AND STANDARDIZING CUSTOMER PURCHASE INFORMATION FOR TARGET MARKETING

FIELD OF THE INVENTION

The present invention relates to the field of gathering and standardizing customer purchase information for target marketing to credit card customers.

BACKGROUND OF THE INVENTION

Every business enterprise works to attract new customers and retain existing customers. Various ways of soliciting business are known. Direct mailing is one know method for soliciting business. A business will send mail to a potential customer, offering various goods and services. Direct mailing, however, may suffer from the drawbacks of offering a potential customer goods or services that are not wanted or needed. Telephone solicitation is another known method. Telephone calls, however, may suffer from the drawback of being considered intrusive by potential customers.

Customer research, including survey information, may assist a marketer in providing services and goods that are wanted. Surveys, however, do not address the particular needs or wants of an individual customer. Surveys, at best, may identify trends among a group of people, not the wants or needs of an individual consumer.

Customer research may also be used to retain existing customers. A company may obtain feed back from existing customers, thereby enabling the company to ascertain what product and services customers want, and how existing products and services can be changed. Such customer research, however, may be difficult to obtain, as it depends upon customers to respond to surveys and/or questions. Meaningful customer feedback may be impractical for companies with large numbers of customers, as the only way to obtain feedback may be by use of telephone calls or direct mailings. Customer feedback may not indicate information on how to attract new customers.

These and other drawbacks exist.

SUMMARY OF THE INVENTION

An object of the present invention is to overcome these and other drawbacks in existing systems.

Another object of the invention is to provide a system and method for storing and manipulating information relating to individual customer purchases.

Another object of the invention is to provide a system and method for creating an organizational structure to store customer purchase information, where the organizational structure comprises a hierarchy of categories and sub-categories.

Another object of the invention is to provide a system and method of creating customer preferences based on customer purchase information.

Another object of the invention is to provide a system and method for targeting offers to customers based on customer preferences.

Another object of the invention is to provide a system and method for placing customer purchase information in an organizational structure through use of a link file, where the link file comprises a plurality of instructions for placing customer purchase information in predetermined places in the organizational structure.

Another object of the invention is to provide a system and method for creating a customer preference database, where the customer preference database includes information about a customer preference and score for various categories and sub-categories.

These and other objects of the invention are accomplished according to various embodiments of the invention. According to one embodiment of the invention, an organizational structure may be created for storing customer purchase information. The organizational structure may comprise a plurality of categories and sub-categories arranged in a hierarchical structure. Customer purchase information placed in one sub-category may be place in a sub-category or category located above in the hierarchical order.

According to another embodiment of the invention, a link file may be created for placing customer purchase information into an organizational structure. A link file may contain a plurality of instructions to a processor. The processor places customer purchase information received from a plurality of different sources, into specific locations within an organizational structure.

Other objects and advantages exist for the present invention.

BRIEF DESCRIPTION OF THE DRAWINGS

FIG. 2 illustrates a presentation of customer purchase information placed within a hierarchical organizational structure according to an embodiment of the invention.

FIG. 3 illustrates an representation of links found in a like file which may be used to place customer purchase information according to an embodiment of the present invention.

FIG. 6 illustrates a presentation of customer scores within a hierarchical organization structure according to an embodiment of the invention.

DETAILED DESCRIPTION OF THE PREFERRED EMBODIMENTS

The present invention may be used for methods and systems for standardizing customer purchase information for financial institutions, and more particularly credit card issuers. Nonetheless, the characteristics and parameters pertaining to the systems and methods are equally applicable to other systems and methods for standardizing customer purchase information, especially where information is obtained from a variety of separate sources.

According to an embodiment of the invention, the present invention relates to a system and method for taking customer purchase information from multiple sources, processing each datum into a standard form, and combining the standardized customer purchase information into a customer preference description. Customer purchase information may comprise any information relevant to creating a customer preference. Customer purchase information may comprise information about specific transactions by a customer (e.g., amount of purchases, location of purchase, what was purchased, etc.), responses to surveys, background information regarding a customer (e.g., age, occupation, income, etc.) and responses to previous offers and solicitations. Customer purchase information may comprise other information as well.

The present invention may further relate computer implemented methods and systems for gathering and standardizing customer purchase information for target marketing to customers. A computer implemented method for standardizing customer purchase information may use a computer system which comprises a storage device for storing the customer purchase information, and a transaction processor for placing the customer purchase information. The method may include creating an organizational structure. The organizational structure may comprise a number of categories and sub-categories arranged in a hierarchy. Information may be input into the organizational structure, and more specifically, placed in the plurality categories and the plurality of sub-categories. Customer preferences may be created based on the information in the organizational structure.

Figure 5:
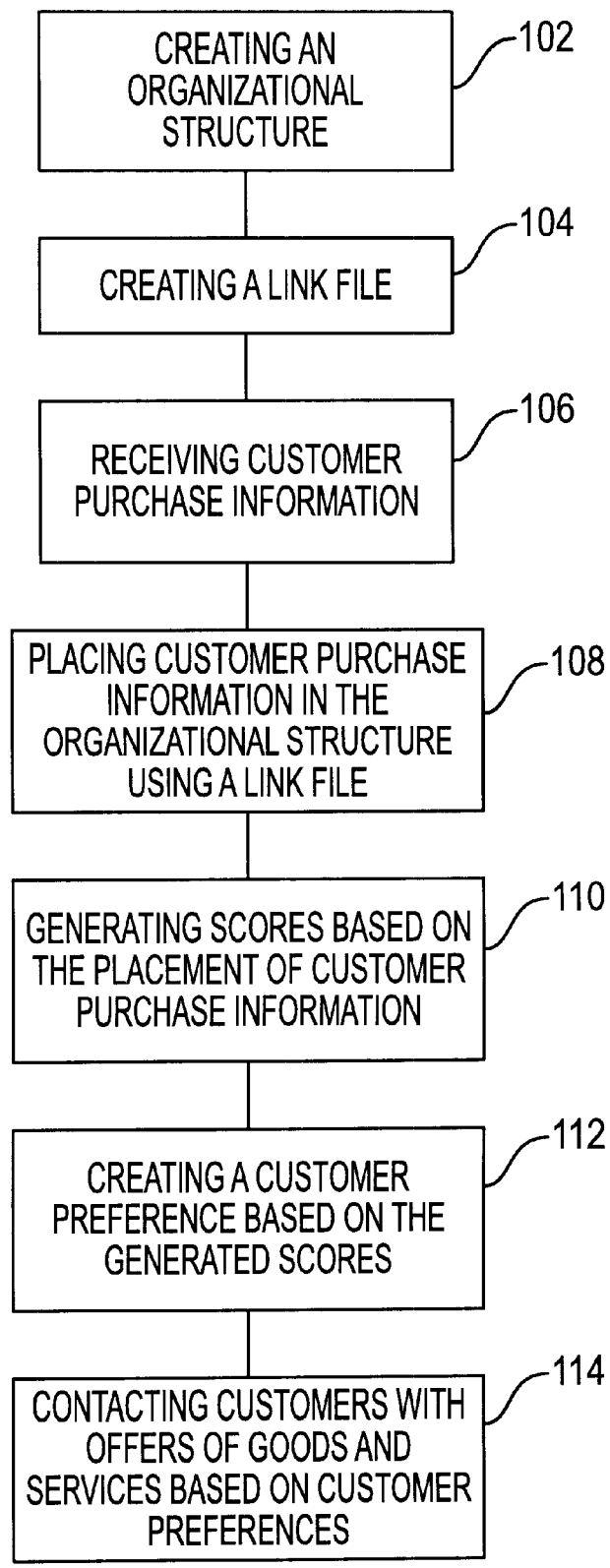
FIG. 5 depicts a flow chart representing a method of implementing the present invention according to an embodiment of the invention.

FIG. 5 illustrates a flowchart according to an embodiment of the present invention. An organizational structure for receiving customer purchase information is created at step 102. The organizational structure, as will be described in more detail below, may comprise a hierarchical structure of categories and sub-categories.

A link file may be created at step 104. According to an embodiment of the invention, a link file may comprise a plurality of instructions governing placement of customer purchase information. A link file may read the various components in the information and place the information in appropriate locations within an organizational structure. According to an embodiment of the invention, creating of a link file may be based on the categories and sub-categories in an organizational structure. Link files will be described in greater detail below.

At step 106, customer purchase information may be placed within appropriate locations of an organizational structure based on a link file. The information may be placed within appropriate categories and sub-categories of an organizational structure.

Scores may be generated based on the placement of customer purchase information, at step 110. According to an embodiment of the invention, scores may generated based on the total dollar amount of purchases made by customers for a particular category or sub-category. Generating scores will be described in greater detail below. Other methods for generating scores may also be used.

A customer preference may be created based on generated scores in step 112. Thus, according to an embodiment of the invention, a customer preference may be created based on a plurality of scores, with each score generated from each category and sub-category of an organizational structure. Other methods for creating customer preferences may also be used.

Using a created customer preferences, at step 114, a customer may be contacted with offers for goods and services. Offers may include telephone calls, direct mailing, e-mail contact, or other methods of contacting a customer.

Other methods for implementing the present invention may also be used. Additional steps may be included, and steps may be omitted. Various steps and aspects of the invention will now be described in more detail.

Customer purchase information may be received from a variety of sources. Mailing lists may provide customer purchase information. Bureau information, such as a credit bureau, may provide initial information about a customer. Bureau information may include all outstanding lines of credit of a customer, the grantor of a line of credit, the initial amount granted, and the balance and interest rate for a line of credit. Other information may be included in bureau information.

When a customer accepts a solicitation and fills out an application for a service, e.g. credit card, debit card, checking account, financial services, etc., more information may be gathered. Additional information may be gathered based on a customers purchases, account activity, and interaction with the financial institution or entity gathering the information. Interaction may include acceptance or non-acceptance of offers made by the entity gathering the information. Customer purchase information may be gathered in other manners, based on the products and services to be potentially offered to a customer.

Standardization of customer purchase information allows an entity, such as, for example, a financial institution or a credit card provider, to better meet the needs of the customer. The more information gathered about a customer, the easier to tailor offers of products and services to what a particular customer really wants or needs.

According to an embodiment of the present invention, data sources relevant to creating customer preferences are determined. A organizational structure setting forth customer preferences may be created. A link file may direct a processor to translate information from data sources into the organizational thereby allowing customer preferences to be created.

One aspect of the present invention involves an organizational structure, which may have both top-down taxonomy and bottom-up taxonomy. The organizational structure stores and classifies customer purchase information. According to an embodiment of the invention, an organizational structure may be a hierarchical database.

Figure 1:
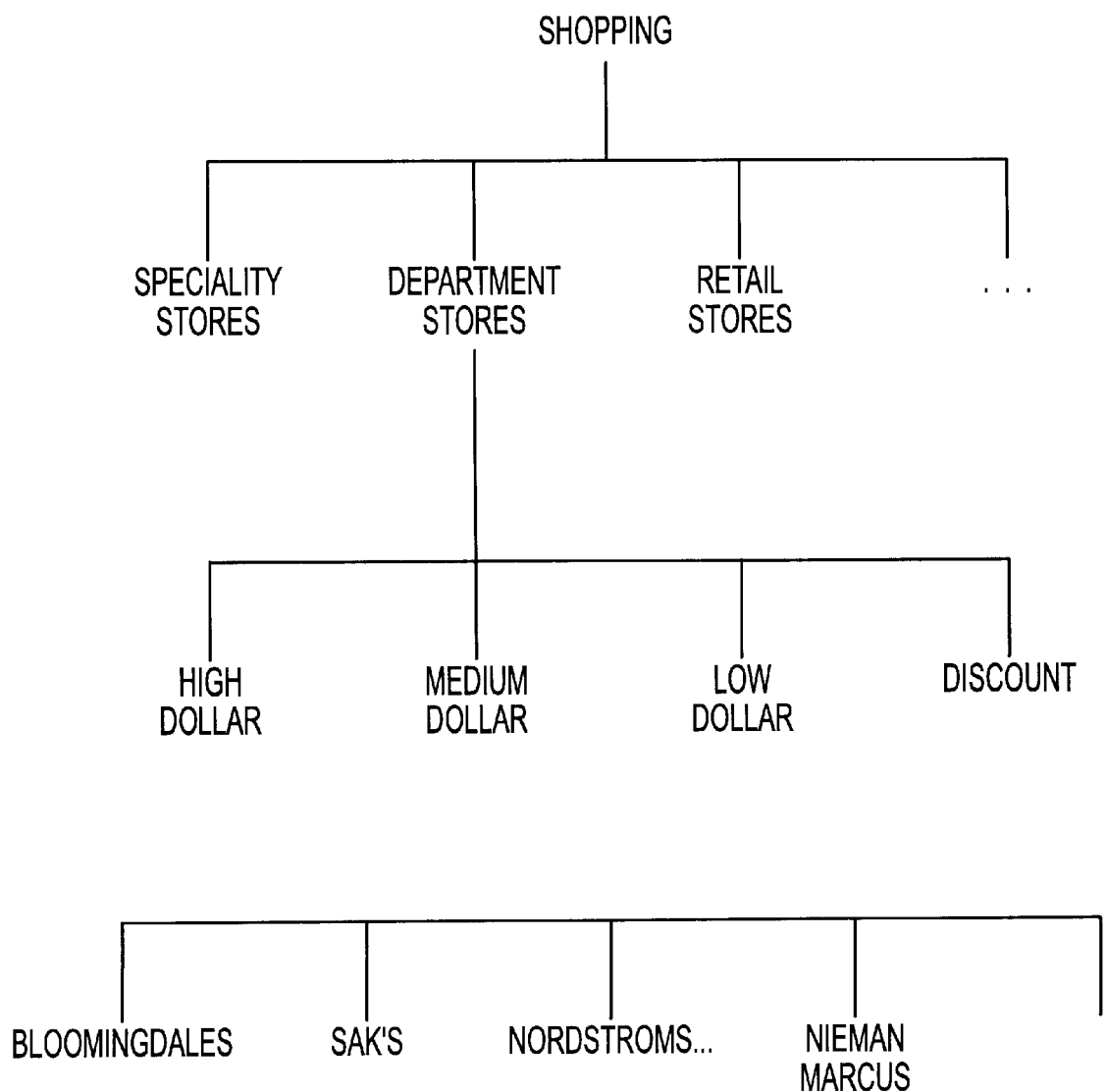
FIG. 1 illustrates a representation of a hierarchical organizational structure according to an embodiment of the invention.

In a top-down taxonomy, or classification, various categories having a number of sub-categories may be created based on brand and research information. As illustrated in FIG. 1, a top-down taxonomy may comprise a category labeled "Shopping." The "Shopping" category may be divided into various sub-categories, such as "Department Stores," "Retail Stores," "Specialty Stores," and the like. Sub-categories, in turn, may divided into further sub-categories. "Department Stores" may be divided into "High Dollar," "Medium Dollar," "Low Dollar," and "Discount" sub-categories. "High Dollar" may further be divided into specific stores, such as "Macy's™," "Nordstorm's™," "Sak's Fifth Avenue™," and other department stores. Particular stores may be further divided among various departments, such as jewelry, cosmetics, men's clothing, women's clothing, and the like. Other levels of sub-categories may be used as needed, according to the level of detail desired for a particular category and the availability of the information.

For example, in an embodiment of the invention, information about a customer purchase at Nordstorm's™ is received. The customer purchase information may be placed under the "Nordstorm's™" sub-category. The customer purchase information, however, may also be placed under the "High Dollar" sub-category, the "Department Store" sub-category, and the "Shopping" category. Additionally, the customer purchase information may be placed in other applicable categories. If the customer purchase at Nordstorm's™ was in the jewelry department, the customer purchase information may also be placed in a "Jewelry" category, and in relevant sub-categories in the "Jewelry" category.

Customer purchase information may comprise various data regarding a specific purchase. According to an embodiment of the invention, customer purchase information may include data about the dollar amount of a purchase, the city and state where the purchase was made, and the particular store where the purchase was made. Other data may also be included.

A bottom-up taxonomy reviews merchant text strings by merchant category code ("MCC"). Merchant text strings may be text information of a customer purchase. Text information may be a merchant description, the merchant's city, the merchant's state, the amount spent, and other information. An MCC may comprise a numerical code to identify a particular merchant. As various purchases are made, the hierarchical structure is evaluated to ensure that the various categories and sub-categories accurately portray customer purchase information. According to an embodiment of the invention, an iterative process may occur as the top-down preference organization may be continually updated by the bottom-up preference organization. According to an embodiment of the invention, customer purchase information must reach certain thresholds to be considered for updating the organizational structure. Thus, for example, data must cover at least a one year period and have transaction is excess of one million dollars to be considered for updating the organizational structure. Other threshold levels may also be used.

In the example of the hierarchical organizational structure above, it may be determined that a large number of purchases are being made which fit under the "Shopping" category, but do not fit under any of the sub-categories currently in use. The organizational structure may be altered to create a new sub-category labeled to fit the purchases, thereby creating a more accurate structure for determining customer preferences. When modifying the organizational structure, categories and sub-categories may be added, deleted, or merged as appropriate.

According to an embodiment of the invention, a customer preference may be created based on generated scores. A score may be based on customer accounts. All customer accounts may be ordered according to predetermined criteria. Predetermined criteria may include customer purchase information in a particular category or sub-category, such as, for example, the total dollar amount of purchases, the number of interactions or purchases in a particular category or sub-category, or other criteria.

Scoring of a customer preference may be based upon the ordering of the customer accounts. According to an embodiment of the invention, the top 10% of accounts according to the ordering may receive a score of 100, the next lower 10% receive a score of 90, and so on, with the bottom 10% receiving a score of 10. Accounts with a value of zero may receive a score of zero. Other scores may also be used. According to an embodiment of the invention, a customer preference may be created based on scoring of customer accounts. A customer preference may be based on all scores received, e.g., scores for each category and sub-category in the organizational structure. Thus, according to an embodiment of the invention, a customer preference discloses the categories and sub-categories where a score of 90 was received, the categories and sub-categories where a score of 80 was received, etc. Other customer preferences may also be created.

Customer purchase information may be compiled according to various manners. FIG. 2 illustrates one manner in which preference information may be compiled and displayed. A table may be displayed with headings for describing the information displayed. Headings may include "Title/Description," "Counts," and Percentage." Other headings may also be displayed.

According to an embodiment of the invention, category and sub-category information may be included under the "Title/Description" heading. Categories, such as "Shopping," "Travel," "Fashion," and other categories, may be included under the "Title/Description" heading, with appropriate sub-categories located beneath the "various" categories. In the example of FIG. BB, the sub-categories "Department Store," "Wholesale Clubs," "Grocery," and other sub-categories of "Shopping" may be displayed Further sub-categories, such as "High Dollar," "Saks™," "Nieman Marcus™," and Bloomingdales™" may be displayed. Descriptions of each category or sub-category may be provided where appropriate.

According to an embodiment, the heading "Counts" may be used to count the number of customers that have some activity within a particular category and sub-category. The heading "Percentage" may be used to display the percentage of customers that have some activity with a particular category or sub-category. The count may be for a relevant time frame.

In an embodiment of the invention, the counts may cover a one year period. Other time periods may also be used. Thus, for example, FIG. 2 illustrates the "Count" and "Percentage" for various categories and sub-categories. The category Shopping, for example, displays the number 1,478 under the heading "Count." Thus, there are 1,478 customers with at least one activity in the "Shopping" category within the relevant time frame. In the example illustrated, the total number of customers is 2,000. The category "Shopping" further displays the number 73.9 under the "Percentage" heading. Thus, 73.9 percent (1478/2000) of all customers have at least one activity in the "Shopping" category within the relevant time frame. The "Nieman Marcus ™" sub-category may have a count total of 212 and a percentage of 10.6 (212/2000). These count and customer numbers are used by way of example only. The present invention may be used for any number of customers and volume of customer purchase information. According to an embodiment, the invention may be used in system with millions of customers, and a large number of categories and sub-categories. The present invention may be limited only by the hardware available for implementation.

FIG. 6 illustrates one manner to compile and display customer scores. A table may be displayed with headings for describing the information displayed. Headings include "Title/Account" and "Score." According to an embodiment of the invention, category and sub-category titles may be included under the "Title/Account" heading.

The categories and sub-categories, such as "Shopping", "Department Stores," "High $," "Saks," "Nieman Marcus," and "Bloomingdales," may be included. Individual customer names may also be included. According to an embodiment of the invention, the name of each customer who has activity in a particular category or sub-category may be listed in the particular category or sub-category. As illustrated in FIG. 6, "Customer A," "Customer B," and "Customer C" represent various customers, and may be indicated for each category and sub-category. Scores for a customer in a particular category or sub-category are indicated under the heading "Score".

Thus, in the example of FIG. 6, under the sub-category "Nieman Marcus," Customer A has a score of 90, Customer B has a score of 60, and Customer C has a score of 30, and Customer C has a score of 30. The scores assigned in the "High $" sub-category represented the combined customers of all sub-categories included in the "High $" sub-category. Inclusion of more customers may affect the score a customer receives. For example, according to an embodiment of the invention, scores may be assigned by the total dollar amount of purchases in a particular category or sub-category. A customer, such as Customer A, might receive a score of 90 for the large dollar amount of purchases at "Nieman Marcus." The Combination of all customers A's purchases at "High $" stores, plus new customers who spent more money, may result in Customer A only receiving a score of 70 in the "High $" sub-category. Customer A's score may raise to an 80 in the "Department Store" sub-category, as customers with lower amounts of purchases are added to the consideration. Other scoring methods may also be used. Other methods for displaying customer purchase information may also be used.

Customer purchase information may be placed within an organizational structure of the present invention. According to an embodiment of the invention, a link file may be created and used to place customer purchase information within an the organizational structure. A link file may be designed to standardize customer purchase information.

Customer purchase information may be received in a purchase storage device from a plurality of separate sources. According to an embodiment of the invention, a plurality of purchase storage devices may be used to receive appropriate information. A link file may be used to access customer purchase information from a purchase storage device and place it into an organizational structure of the present invention. According to an embodiment of the invention, a link file may comprise a plurality of instructions. These instructions may direct a processor to place customer purchase information in predetermined locations within an organizational structure. Placement of customer purchase information aids in standardizing various types of customer purchase information. Thus, according to an embodiment of the invention, a link file may comprise thousands of links to place information in an appropriate location(s) within an organizational structure. Customer purchase information may be placed within appropriate categories and sub-categories of an organizational structure.

FIG. 3 illustrates, according to an embodiment of the present invention, an example of links, which may be located within a link file and which may be used to place customer purchase information into an organizational structure. Links may comprise operator instructions, preference code information, character instruction information, word string information, and other information.

According to an embodiment of the invention, operator instructions direct a processor(s) to perform a variety of operations for placing information within an organizational structure of the present invention. A processor may search a purchase storage device, retrieve specified customer purchase information, and place the retrieved information in an organizational structure of the present invention. Preference code information may indicate the preference category or sub-category to assign the results of a particular operator instruction. Character instruction information may indicate the number of characters to access, while word-string information may indicate the particular character to access. Other information interaction may also occur.

According to an embodiment of the invention, operator instructions may instruct a processor to access information from a purchase storage device. Operator instructions may contain a plurality of instructions for a processor. In an embodiment, an operator instruction may include various components, including character matching, word matching, and duration of processing. Other operator components may also be used.

According to an embodiment of the invention, character matching components may instruct a processor to search a purchase storage device by various character parameters. Character parameters may include searching column by column in an organizational structure for character matching, searching all of a column for two word matching, searching all of a column but the first word for matching, and other character parameters.

Word matching components may instruct a processor to search for a specific word in a text-string in the customer purchase database. Word matching may include matching a particular word, matching two words and searching the entire column, searching for two words but searching all but the first word, and searching for a specific city and/or state. Other word matching instructions may also be used.

Length of processing components may direct a processor to end processing. According to an embodiment, length of processing instructions may instruct a transaction processor to stop after finding a first match, stop after finding a predetermined number of matches, or look for all matches within a customer purchase database. Other length of processing instructions may also be used.

As noted above, a combination of word matching, character matching, and length of processing components may instruct a processor to access information from a purchase storage device. An operator instruction according to an embodiment may instruct a processor to perform a column by column character match for each word found in a description in the purchase storage device. The character match may be for a specific length, but the first word of the description is not search. Once a match is found, the processing may stop.

According to another embodiment of the invention, an operator instruction may instruct a processor to skip the first word of a description and search the remaining words for two matches. The first word may be matched for a specific length against all remaining words found in the description. If a match is found, all remaining words are matched against the second word. Processing may be stopped if a match to the two words is found. Other operating instructions may also be used. Operating instructions may comprise a variety of combinations of word matching, character matching, length of processing, and other information and/or instructions. These combinations will only be limited by the capabilities of the transaction processor and the needs of the user.

As illustrated by the example of FIG. 3, operation instructions may be assigned numerical values. By way of example only, 00 may be an operator instruction to began looking under a specific merchant category code. An operator instruction designated by the number "1" may instruct a processor to perform a column by column character match for each word in the description for a specified length, where processing is stopped if a match is found. According the embodiment illustrated in FIG. 3, the number 99 may designate the operator instruction to stop a processor from accessing any other information from a purchase storage device. Other designations, including text and alphanumeric, may be used to represent operator instructions. As will be apparent to one of ordinary skill in the art, any number and/or type of operator instructions may be use to access a purchase storage device. The type of operator instruction used may depend upon the processor used and the type of information to be placed in an organizational structure.

Again, as illustrated in the example of FIG. 3, a link may comprise an operator instruction, preference code information, character information, and word-string information. As explained above, the operator instruction may direct a processor to search a purchase storage device. Preference code information may be used to represent a category or sub-category of an organizational structure. According to an embodiment of the invention, preference code information in a link may indicate under which category or sub-category information retrieved by the search will be placed.

According to an embodiment of the invention, a character information and word-string information may interact to provide information to a processor. Character information may instruct a processor to look for a particular number of characters, while the word-string information may instruct a processor regarding which particular characters to search for a purchase storage device.

By way of example only, FIG. 3 illustrates a number of links which may be used with an embodiment of the present invention. In one example, a link may set forth as:

1 727 05 DELL_ wherein "1" designates an operator instruction, "727" designates preference code information, "05" designates the character information, and "DELL_" designates the word-string information. According to an embodiment of the invention, a "_" may be used to indicate a space character. Thus, "DELL_" would not be confused with "DELLCOM". In this example, the operator instruction "1" may instruct the operator to perform a column by column character match for each word in the description for a specified length, where processing is stopped if a match is found. The number of characters to look for (i.e., the specified length), may be designated within the link by the character information "05". The characters searched for may be designated within the link by the word-string information "DELL_". Thus, in the present example, the transaction processor may be instructed to search a purchase storage device for the word-string "DELL_" for length of 5 characters.

Another example of links may be set forth as:

| 6 | 651 | 05 | "LEVI_" |
| 6 | 651 | 06 | "LEVI'S" |
| 6 | 651 | 06 | "LEVIS_" | wherein "6" represents an operator instruction, "651" represents a preference code information, "05" and "06" represent character information, and "LEVI_", "LEVI'S", and "LEVIS_" represent word string information. The "6" operator instruction may instruct a processor to perform a character match column by column for the word found in the word-string (in this example, either "LEVI_", "LEVI'S", or "LEVIS_"), but not searching the first word in the hierarchical database. The preference code information "651" may apply to the sub-category entitled "Clothing." A processor may search a purchase storage device for 5 or 6 character strings that match the appropriate word-strings, "LEVI_", "LEVI'S", or "LEVIS_".

Text descriptions in a purchase storage device may be provided by individual merchants. Descriptions, therefore, may not be uniform between each merchant. According to the embodiment of the preceding example, multiple links may be used to account for non-uniformity of merchant descriptions. In the three link example immediately above, three different links may be used to account for the non-uniformity. One link may search for "LEVI_", one link may search for "LEVI'S" and a third link may search for "LEVIS_". A plurality of links allows for a term to be searched while reducing the probability that information will not be found due to non-uniformity. Other types of links may also be used.

According to an embodiment of the invention, links in a link file may be updated. Links may be updated to account for modifications of the organizational structure, such as deletions, additions and/or merging of categories or sub-categories. Links may also be updated to account for changes in customer purchase information, such as new stores or products. Links may be updated to account for changes in customer purchase information, such as new stores or products. Links may also be updated for other reasons.

Figure 4:
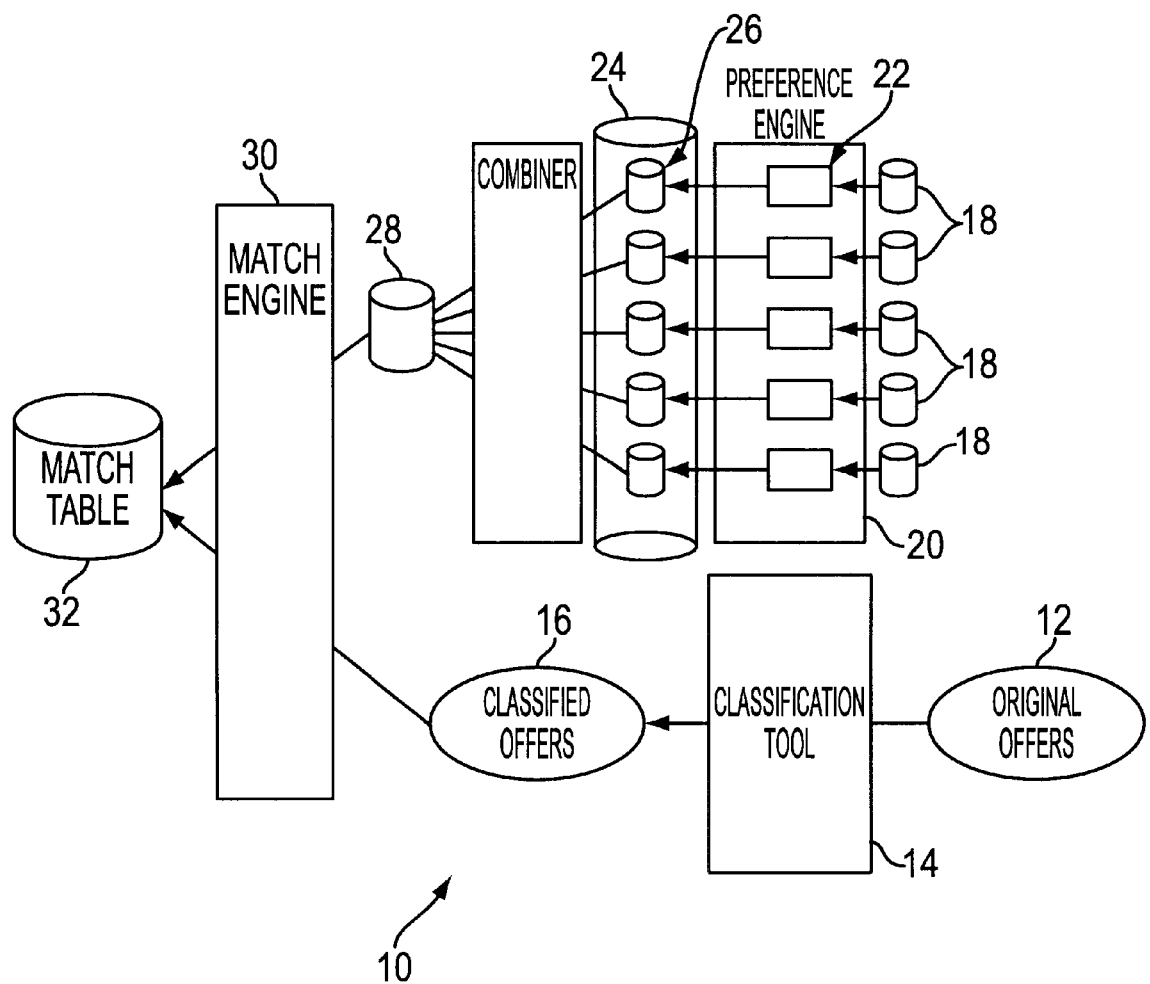
FIG. 4 illustrates a depiction of a system for implementing the present invention according to an embodiment of the invention.

FIG. 4 illustrates a system 10 according to an embodiment of the invention. Original offers 12 are sent through a classification tool 16, thereby creating classified offers 16. Various types of customer information 18 is input into a preference engine 20, which may comprise a plurality of processors 22. According to an embodiment of the invention, each type of customer information 18 has a separate processor 22. Customer information 18, as described above, may include previous credit card transactions, customer profiles, customer applications, and other information. Customer information 18 is sorted into a preference database 24, which may comprise a plurality of output databases 26. According to an embodiment of the invention, output from each processor 22 is placed into a separate output database 26. Relevant customer information is combined into customer accounts in an account database 28. A match engine 30 combines relevant customer information from the account database 28 and classified offers 16 to form a match table 32. Match table 32 may rank various classified offers with respect to each account.

It will be appreciated by those of ordinary skill in the art that the system for implementing the present invention may comprise a variety of different components and/or configurations. Separate devices may be used to implement each function. According to an embodiment of the invention, a computer processing unit may be configured to implement the various aspects of the invention. Other components, configurations, or combinations thereof may also be used.

The present invention has been described in reference to customer purchase information received from credit card transactions. Customer purchase information, however, may come from a variety of sources. In particular, customer purchase information may be received from debit card purchases, check purchases, and other types of purchases where information may be gathered.

According to another embodiment of the present invention, a computer usable medium having computer readable program code embodied therein for presenting table information in portions may be provided. For example, the computer usable medium may comprise a CD ROM, a floppy disk, a hard disk, or any other computer usable medium. One or more of the aspects of a system according to the present invention may comprise readable program code that is provided on the computer usable medium such that when the computer usable medium is installed on a computer system, those modules cause the computer system to perform the functions described.

These and other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. In a computer implemented system for storing and manipulating customer purchase information received from a plurality of sources, the computer system comprising a storage device for storing the customer purchase information and a processor for placing the customer purchase information, a method for organizing the customer purchase information comprising the steps of:

creating an organizational structure in the storage device, wherein the organizational structure comprises a plurality of categories, each category comprising a plurality of sub-categories arranged in a hierarchy;

receiving the customer purchase information; and placing the customer purchase information into at least one of the plurality of categories and the plurality of sub-categories using the processor.

2. The method according to claim 1, wherein the step of placing customer purchase information further comprises:

placing the customer purchase information in a first sub-category; and placing the customer information in one of the sub-category or the category above the first sub-category in the hierarchy.

3. The method according to claim 2, further comprising the step of creating a customer preference based on the customer purchase information and the category and sub-category where the customer purchase information is located.

4. The method according to claim 1, wherein the customer purchase information comprises at least one of:

(a) a dollar amount of a customer purchase;
(b) a city where a customer purchase was made;
(c) a state where a customer purchase was made; and
(d) a store where a customer purchase was made.

5. The method according to claim 1, further comprising the step of creating a customer preference based on the customer purchase information and the category and sub-category where the customer purchase information is located.

6. The method according to claim 1, wherein customer purchase information comprises customer purchase data for a plurality of individual customer purchases; and wherein the step of placing customer purchase information comprises placing the customer purchase data for an individual customer purchase into at least one predetermined category or sub-category.

7. The method according to claim 6, further comprising the step of creating a customer preference based on the placement of the customer purchase information into the at least one predetermined category or sub-category.

8. The method according to claim 7, wherein the step of creating a customer preference further comprises:

combining customer purchase information for an individual customer located within a particular category or sub-category;

assigning a value to the combined customer purchase information; and creating a customer preference based on the assigned value.

9. The method according to claim 8, wherein the step of assigning a value includes assigning a value based on dollar amount of purchases made by a customer over a predetermined period of time.

10. The method according to claim 8, further comprising the steps of:

creating a customer account; and placing the customer preference in the customer account.

11. The method according to claim 1, wherein the customer purchase information is based on a method of payment, wherein the method of payment comprises at least one of:

(a) credit card purchases;
(b) debit card purchases; and
(c) cheque purchases.

12. The method according to claim 1, further comprising the step of modifying the organizational structure based on the received customer purchase information.

13. The method according to claim 12, wherein the step of modifying includes at least one of:

(a) adding a category;
(b) adding a sub-category;
(c) deleting a category;
(d) deleting a sub-category;
(e) merging a category; and
(f) merging a sub-category.

14. The method according to claim 1, wherein the step of placing the customer purchase information further comprises using a link file to direct the processor, the link file comprising a plurality of instructions directing the processor to place customer purchase information in a predetermined location in the organizational structure.

15. The method according to claim 14, wherein the predetermined location in the organizational structure is determined based on the customer purchase information.

16. A system for manipulating customer purchase information received from a plurality of sources, the system comprising:

means for creating an organizational structure in a storage means, wherein the organizational structure comprises a plurality of categories, each category comprising a plurality of sub-categories arranged in a hierarchy;

means for receiving the customer purchase information; and means for placing the customer purchase information into at least one of the plurality of categories and the plurality of sub-categories using the processor.

17. The system according to claim 16, wherein the means for placing customer purchase information further comprises:

means for placing the customer purchase information in a first sub-category; and means for placing the customer information in one of the sub-category or the category above the first sub-category in the hierarchy.

18. The system according to claim 17, further comprising means for creating a customer preference based on the customer purchase information and the category and sub-category where the customer purchase information is located.

19. The system according to claim 16, wherein the customer purchase information comprises at least one of:

(a) a dollar amount of a customer purchase;
(b) a city where a customer purchase was made;

(c) a state where a customer purchase was made; and (d) a store where a customer purchase was made.

20. The system according to claim 16, further comprising means for creating a customer preference based on the customer purchase information and the category and sub-category where the customer purchase information is located.

21. The system according to claim 16, wherein customer purchase information comprises customer purchase data for a plurality of individual customer purchases; and wherein the means for placing customer purchase information comprises means for placing the customer purchase data for an individual customer purchase into at least one predetermined category or sub-category.

22. The system according to claim 21, further comprising means for creating a customer preference based on the placement of the customer purchase information into the at least one predetermined category or sub-category.

23. The system according to claim 22, wherein the means for creating a customer preference further comprises:

means for combining customer purchase information for an individual customer located within a particular category or sub-category;

means for assigning a value to the combined customer purchase information; and means for creating a customer preference based on the assigned value.

24. The system according to claim 23, wherein the means for assigning a value includes means for assigning a value based on dollar amount of purchases made by a customer over a predetermined period of time.

25. The method according to claim 23, further comprising:

means for creating a customer account; and means for placing the customer preference in the customer account.

26. The system according to claim 16, wherein the customer purchase information is based on a method of payment, wherein the method of payment comprises at least one of:

(a) credit card purchases;

(b) debit card purchases; and (c) cheque purchases.

27. The system according to claim 16, further comprising means for modifying the organizational structure based on the received customer purchase information.

28. The system according to claim 27, wherein modifying the organizational structure comprises at least one of:

(a) adding a category;

(b) adding a sub-category;

(c) deleting a category;

(d) deleting a sub-category;

(e) merging a category; and (f) merging a sub-category.

29. The system according to claim 16, wherein the means for placing the customer purchase information further comprises means for using a link file to direct the processor, the link file comprising a plurality of instructions directing the processor to place customer purchase information in a predetermined location in the organizational structure.

30. The system according to claim 29, wherein the predetermined location in the organizational structure is determined based on the customer purchase information.

31. In a computer implemented system for storing and manipulating customer purchase information received from a plurality of sources, the computer system comprising a purchase storage device for receiving the customer purchase information, an organizational structure storage device for storing the customer purchase information, and a processor for accessing and placing the customer purchase information, the method of creating a customer account comprising the steps of:

receiving customer purchase information at the purchase storage device;

accessing the customer purchase information from the purchase storage device;

placing the customer purchase information in a predetermined location in the organizational structure storage device; and creating a customer preference based on the placement of the customer purchase information in the organizational structure storage device.

32. The method according to claim 31, wherein the step of placing the customer purchase information includes using a link file to direct the processor.

33. The method according to claim 32, wherein the link file comprises a plurality of instructions directing the processor to access predetermined customer purchase information and place the accessed customer purchase information in a predetermined location in the organizational structure storage device.

34. The method according to claim 32, further comprising the step creating an organizational structure in the organizational structure storage device, wherein the organizational structure comprises a plurality of categories, each category comprising a plurality of sub-categories arranged in a hierarchy.

35. The method according to claim 34, wherein the link file comprises a plurality of instructions directing the processor to access predetermined customer purchase information and place the accessed customer purchase information in a predetermined category or sub-category of the organization structure.

36. The method according to claim 31, wherein the predetermined location in the organizational structure storage device is determined based on the customer purchase information.

37. The method according to claim 31, wherein the customer purchase information is based on a method of payment, wherein the method of payment comprises at least one of:

(a) credit card purchases;

(b) debit card purchases; and (c) cheque purchases.

38. The method according to claim 31, further comprising the step creating an organizational structure in the organizational structure storage device, wherein the organizational structure comprises a plurality of categories, each category comprising a plurality of sub-categories arranged in a hierarchy.

39. The method according to claim 38, wherein customer purchase information includes customer purchase data for a plurality of individual customer purchases; and wherein the step of placing customer purchase information includes placing the customer purchase data for an individual customer purchase into at least one predetermined category or sub-category.

40. The method according to claim 38, further comprising the steps of modifying the organizational structure based on the received customer purchase information.

41. The method according to claim 40, wherein the step of modifying comprises at least one of:

(a) adding a category;
(b) adding a sub-category;
(c) deleting a category;
(d) deleting a sub-category;
(e) merging a category; and
(f) merging a sub-category.

42. The method according to claim 31, wherein the step of creating a customer preference further comprises:

combining customer purchase information for an individual customer located within a particular category or sub-category;

assigning a value to the combined customer purchase information; and creating a customer preference based on the assigned value.

43. The method according to claim 42, wherein the step of assigning a value includes assigning a value based on dollar amount of purchase made by a customer over a predetermined period of time.

44. The method according to claim 42, further comprising the steps of:

creating a customer account; and placing the customer preference in the customer account.

45. A system for manipulating customer purchase information received from a plurality of sources comprising:

means for receiving customer purchase information;

means for accessing the customer purchase information and placing the customer purchase information in a predetermined location in an organizational structure storage means; and means for creating a customer preference based on the placement of the customer purchase information in the organizational structure storage means.

46. The system according to claim 44, wherein placing the customer purchase information includes using a link file to direct the means for accessing and placing.

47. The method according to claim 46, wherein the link file comprises a plurality of instructions directing the accessing and placing means to access predetermined customer purchase information and place the accessed customer purchase information in a predetermined location in the organizational structure storage means.

48. The system according to claim 46, further comprising means for creating an organizational structure in the organizational structure storage means, wherein the organizational structure comprises a plurality of categories, each category comprising a plurality of sub-categories arranged in a hierarchy.

49. The system according to claim 48, wherein the link file comprises a plurality of instructions directing the accessing and placing means to access predetermined customer purchase information and place the accessed customer purchase information in a predetermined category or sub-category of the organization structure.

50. The system according to claim 45, wherein the predetermined location in the organizational structure storage means is determined based on the customer purchase information.

51. The system according to claim 45, wherein the customer purchase information is based on a method of payment, wherein the method of payment comprises at least one of:

(a) credit card purchases;
(b) debit card purchases; and
(c) cheque purchases.

52. The system according to claim 45, further comprising means for creating an organizational structure in the organizational structure storage means, wherein the organizational structure comprises a plurality of categories, each category comprising a plurality of sub-categories arranged in a hierarchy.

53. The system according to claim 52, wherein customer purchase information includes customer purchase data for a plurality of individual customer purchases; and wherein the means for accessing and placing customer purchase information includes means for placing the customer purchase data for an individual customer purchase into at least one predetermined category or sub-category.

54. The system according to claim 52, further comprising means for modifying the organizational structure based on the received customer purchase information.

55. The system according to claim 54, wherein modifying the organizational structure comprises at least one of:

(a) adding a category;
(b) adding a sub-category;
(c) deleting a category;
(d) deleting a sub-category;
(e) merging a category; and
(f) merging a sub-category.

56. The system according to claim 45, wherein the means for creating a customer preference further comprises:

means for combining customer purchase information for an individual customer located within a particular category or sub-category;

means for assigning a value to the combined customer purchase information; and means for creating a customer preference based on the assigned value.

57. The system according to claim 56, wherein assigning a value includes assigning a value based on dollar amount of purchase made by a customer over a predetermined period of time.

58. The system according to claim 56, further comprising:

means for creating a customer account; and means for placing the customer preference in the customer account.

* * * * *